US012761572B2

(12) United States Patent
Noji et al.

(10) Patent No.: US 12,761,572 B2
(45) Date of Patent: Oct. 13, 2026

(54) NONMAGNETIC TONER

(71) Applicant: CANON KABUSHIKI KAISHA, Tokyo (JP)

(72) Inventors: Shintaro Noji, Shizuoka (JP); Mariko Yamashita, Shizuoka (JP); Kenji Aoki, Shizuoka (JP); Yuhei Terui, Shizuoka (JP); Takashi Matsui, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 497 days.

(21) Appl. No.: 18/339,649

(22) Filed: Jun. 22, 2023

(65) Prior Publication Data

US 2023/0418172 A1 Dec. 28, 2023

(30) Foreign Application Priority Data

Jun. 22, 2022 (JP) ................................ 2022-100376

(51) Int. Cl.
*G03G 9/08* (2006.01)
*G03G 9/087* (2006.01)
*G03G 9/09* (2006.01)

(52) U.S. Cl.
CPC ....... *G03G 9/0821* (2013.01); *G03G 9/08711* (2013.01); *G03G 9/0918* (2013.01)

(58) Field of Classification Search
CPC . G30G 9/0821; G03G 9/08711; G03G 9/0918
See application file for complete search history.

(56) References Cited

U.S. PATENT DOCUMENTS

2005/0214670 A1* 9/2005 Matsumoto ........ G03G 9/08755 430/123.54
2009/0035682 A1 2/2009 Shima
2014/0308611 A1 10/2014 Shimano et al.
2017/0045834 A1* 2/2017 Shirai ................ G03G 9/08724
2019/0384195 A1 12/2019 Saeki
2020/0225598 A1 7/2020 Sriskandha
2021/0181647 A1* 6/2021 Hashimoto .......... C08G 63/183
2022/0107573 A1 4/2022 Akiyama

FOREIGN PATENT DOCUMENTS

| | | | |
|---|---|---|---|
| JP | H0934163 | A | 2/1997 |
| JP | 2004191927 | A | 7/2004 |
| JP | 2014130243 | A | 7/2014 |
| JP | 2014142632 | A | 8/2014 |
| JP | 2016-066018 | A | 4/2016 |
| JP | 2016110150 | A | 6/2016 |
| JP | 2016-218237 | A | 12/2016 |
| JP | 2018-151619 | A | 9/2018 |
| JP | 2019-219645 | A | 12/2019 |
| JP | 2020173414 | A | 10/2020 |
| JP | WO2019225207 | A1 | 2/2021 |
| JP | 2021-036316 | A | 3/2021 |
| JP | 2021-096463 | A | 6/2021 |
| JP | 2021092707 | A | 6/2021 |
| JP | 2021096278 | A | 6/2021 |
| WO | 2013047296 | A1 | 4/2013 |

* cited by examiner

*Primary Examiner* — Mark F. Huff
*Assistant Examiner* — Charles Collins Sullivan, IV
(74) *Attorney, Agent, or Firm* — Canon.U.S.A., Inc. IP Division

(57) ABSTRACT

A nonmagnetic toner comprises a nonmagnetic toner particle. The nonmagnetic toner particle comprises a crystalline resin A, an amorphous resin B, and a colorant. The crystalline resin A has a monomer unit (a). the amorphous resin B has a monomer unit (b). A content of the crystalline resin A in the nonmagnetic toner is 10.0 to 58.0 mass %. The sum of the contents of the crystalline resin A and the amorphous resin B in the nonmagnetic toner is 65.0 mass % or more. A content of the monomer unit (a) in the crystalline resin A is 50.0 to 100.0 mass %. Using SPA $[(J/cm^3)^{0.5}]$ for a SP value of the crystalline resin A and using SPB $[(J/cm^3)^{0.5}]$ for a SP value of the amorphous resin B, SPA and SPB satisfy $0.15 \leq SPB-SPA \leq 2.00$.

5 Claims, No Drawings

NONMAGNETIC TONER

BACKGROUND OF THE INVENTION

Field of the Invention

The present disclosure relates to the nonmagnetic toner used in electrophotographic methods and electrostatic recording methods.

Description of the Related Art

Energy savings have come to be regarded in recent years as a major technical issue for electrophotographic devices, and substantial reductions in the amount of heat required by the fixing apparatus are desired. In particular, with regard to the toner, there is great need for fixing to be made possible at lower energies, i.e., for "low-temperature fixability".

Toner to which plasticizer has been added has been considered, for example, in WO 2013/047296, as a technique for enabling fixing at low temperatures. The plasticizer operates to speed up the softening rate of the binder resin while maintaining the glass transition temperature (Tg) of the toner unchanged and can thus improve the low-temperature fixability. However, the toner softens via a step of plasticization of the binder resin after the plasticizer has melted, and as a consequence there is a limit on the toner melting rate and additional improvements in the low-temperature fixability are desired.

The method of using a crystalline resin as the binder resin has therefore been considered. The molecular chains in a crystalline resin exhibit a regular arrangement, and due to this a crystalline resin has the property of undergoing almost no softening at temperatures below the melting point. In addition, the crystals melt rapidly when the melting point is exceeded and a rapid decline in the viscosity occurs in association with this. As a consequence, crystalline resins have been receiving attention as materials that have an excellent sharp melt property and exhibit low-temperature fixability.

Side-chain crystalline resins are one example of the crystalline resins used for the binder resins in toners. A side-chain crystalline resin is a vinyl polymer in which a monomer unit having a long-chain alkyl group in side chain position is incorporated in the main chain of the molecule. A side-chain crystalline resin has a long-chain alkyl group in side chain position in the molecule and exhibits crystallinity because the side-chain long-chain alkyl groups assume a regular arrangement with each other, both intramolecularly and intermolecularly, resulting in crystallization. A crystallized side-chain crystalline resin exhibits a sharp melt property because the molecules readily disengage, and as a result has properties favorable for low-temperature fixing. On the other hand, the resistance to impact tends to be low, and side-chain crystalline resins thus exhibit a durability disadvantage when used as the main component of a binder resin.

As a countermeasure to this, the present inventors have proposed toners that employ a highly impact-resistant amorphous resin in combination with a side-chain crystalline resin, as in Japanese Patent Application Laid-open Nos. 2014-130243 and 2014-142632.

However, it has been found that the toners described in Japanese Patent Application Laid-open Nos. 2014-130243 and 2014-142632, while being satisfactory with regard to low-temperature fixability, heat-resistant storability, and durability, still have room for further improvement in the charge rise performance. An interface between the side-chain crystalline resin and amorphous resin is inevitably present in each toner particle in a toner that uses a side-chain crystalline resin+amorphous resin combination. It is thought that a state of entanglement between the molecular chains of the side-chain crystalline resin and the molecular chains of the amorphous resin is present at this interface, and that the crystallinity is locally low in this interface region and the molecular chains are in a state of very facile mobility. It is thought that as a consequence, when toner charging is being attempted, charge on the toner is dissipated due to the mobility of the molecular chains in the interface region and as a result there is room for further improvement with regard to the charge rise performance.

SUMMARY OF THE INVENTION

In view of the preceding, additional improvements are thus desirable in order to realize a toner that exhibits an excellent low-temperature fixability, heat-resistant storability, and durability and that also exhibits an excellent charge rise performance.

The present disclosure provides a nonmagnetic toner that exhibits an excellent low-temperature fixability, heat-resistant storability, and durability and that also exhibits an excellent charge rise performance.

The present disclosure relates to a nonmagnetic toner comprising a nonmagnetic toner particle, the nonmagnetic toner particle comprising a crystalline resin A, an amorphous resin B, and a colorant, wherein the crystalline resin A has a monomer unit (a) represented by formula (a); the amorphous resin B has a monomer unit (b) represented by formula (b); a content of the crystalline resin A in the nonmagnetic toner is 10.0 to 58.0 mass %; the sum of the contents of the crystalline resin A and the amorphous resin B in the nonmagnetic toner is 65.0 mass % or more; a content of the monomer unit (a) in the crystalline resin A is 50.0 to 100.0 mass %; and using SPA $[(J/cm^3)^{0.5}]$ for a SP value of the crystalline resin A and using SPB $[(J/cm^3)^{0.5}]$ for a SP value of the amorphous resin B, SPA and SPB satisfy $0.15 \leq SPB-SPA \leq 2.00$:

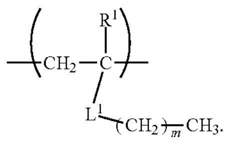

(a)

In the formula (a), $R^1$ represents a hydrogen atom or a methyl group, $L^1$ represents a single bond or a divalent linking group, and m represents an integer from 15 to 35:

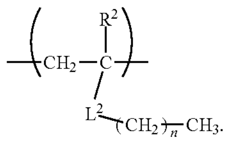

(b)

In the formula (b), $R^2$ represents a hydrogen atom or a methyl group, $L^2$ represents a single bond or a divalent linking group, and n represents an integer from 10 to 30.

The present disclosure can thereby provide a nonmagnetic toner that exhibits an excellent low-temperature fixability, heat-resistant storability, and durability and that also exhibits an excellent charge rise performance. Further features of the present disclosure will become apparent from the following description of exemplary embodiments.

DESCRIPTION OF THE EMBODIMENTS

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably. The term "(meth)acrylic acid ester" means an acrylic acid ester and/or a methacrylic acid ester.

The term "monomer unit" refers to a reacted form of a monomer material included in a polymer. For example, a section including a carbon-carbon bond in a main chain of a polymer formed through polymerization of a vinyl monomer will be referred to as a single unit. A vinyl monomer can be represented by the following formula (C).

(C)

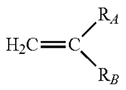

In the formula (C), $R_A$ represents a hydrogen atom or an alkyl group (preferably, an alkyl group having 1 to 3 carbon atoms, and more preferably a methyl group), and R B represents any substituent. The term "crystalline resin" refers to a resin that has a clear endothermic peak in differential scanning calorimetry (DSC).

The present inventors discovered that the aforementioned disadvantage can be solved by introducing a monomer unit having a long-chain alkyl segment into both the side-chain crystalline resin and amorphous resin that constitute the nonmagnetic toner, and by exercising, for these two species of resin, suitable control of the relationship between their SP values, their contents in the nonmagnetic toner, and the amounts of introduction of the two.

The present disclosure relates to a nonmagnetic toner comprising a nonmagnetic toner particle comprising a crystalline resin A, an amorphous resin B, and a colorant, wherein the crystalline resin A has a monomer unit (a) represented by formula (a); the amorphous resin B has a monomer unit (b) represented by formula (b); a content of the crystalline resin A in the nonmagnetic toner is 10.0 to 58.0 mass %; the sum of the contents of the crystalline resin A and the amorphous resin B in the nonmagnetic toner is 65.0 mass % or more; a content of the monomer unit (a) in the crystalline resin A is 50.0 to 100.0 mass %; and using SPA $[(J/cm^3)^{0.5}]$ for a SP value of the crystalline resin A and using SPB $[(J/cm^3)^{0.5}]$ for a SP value of the amorphous resin B, SPA and SPB satisfy $0.15 \leq SPB-SPA \leq 2.00$:

(a)

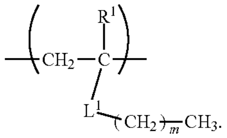

In the formula (a), $R^1$ represents a hydrogen atom or a methyl group, $L^1$ represents a single bond or a divalent linking group, and m represents an integer from 15 to 35:

(b)

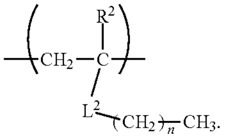

In the formula (b), $R^2$ represents a hydrogen atom or a methyl group, $L^2$ represents a single bond or a divalent linking group, and n represents an integer from 10 to 30.

The authors think the following with regard to the mechanisms by which the effects of the present disclosure are exhibited. The crystalline resin A in the present disclosure is a side-chain crystalline resin having a substructure that has a long-chain alkyl group in side chain position, and exhibits a sharp melt property. As a consequence, when the crystalline resin A is comprised in the nonmagnetic toner particle, a sharp melt property is conferred on the nonmagnetic toner and low-temperature fixability and heat-resistant storability are achieved.

On the other hand, a high durability can be achieved when a nonmagnetic toner particle contains an amorphous resin. However, when the nonmagnetic toner particle uses a crystalline resin A and an amorphous resin in combination, an interface is present between the crystalline resin A and the amorphous resin. At such an interface, entanglement between the molecular chains of the resins results in a locally low resin crystallinity and a state of very facile molecular chain mobility. It is thought that as a consequence, charge dissipation at the interface occurs and there thus is room for further improvement with regard to the charge rise performance.

Here, in the present disclosure, a nonmagnetic toner particle comprises an amorphous resin B Like the crystalline resin A, the amorphous resin B is also a resin that has a substructure having a long-chain alkyl group in side chain position. When both the crystalline resin A and the amorphous resin B have a long-chain alkyl group in side chain position, the reduction in resin crystallinity at the interface can be kept to a minimum even when the molecular chains are entangled. The nonmagnetic toner according to the present disclosure, which exhibits an excellent low-temperature fixability, heat-resistant storability, and durability as well as an excellent charge rise performance, is achieved due to these mechanisms.

The nonmagnetic toner according to the present disclosure is particularly described in the following. The nonmagnetic toner particle comprises the crystalline resin A. A nonmagnetic toner that exhibits an excellent low-temperature fixability and heat-resistant storability is provided, when the nonmagnetic toner particle comprises the crystalline resin A. The crystalline resin A has a monomer unit (a) represented by the following formula (a). As a consequence of this, the crystalline resin A is a side-chain crystalline resin.

(a)

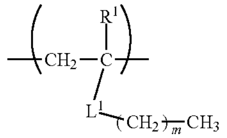

In formula (a), $R^1$ represents a hydrogen atom or a methyl group, $L^1$ represents a single bond or a divalent linking group, and m represents an integer from 15 to 35.

Formula (a) indicates that the crystalline resin A has a long-chain alkyl group, and the exhibition of crystallinity by the crystalline resin A is facilitated by the presence of the long-chain alkyl group as a side chain. When the m in formula (a) is less than 15, the crystallinity is prone to be inadequate and the durability and heat-resistant storability decline. The m in formula (a) is preferably 15 to 30, more preferably 17 to 29, and even more preferably 19 to 23.

There are no particular limitations on the divalent linking group when the $L^1$ in formula (a) is a divalent linking group, but it can be exemplified by an amide group, an ester group, an urethane group, an urea group, an alkylene group, a phenylene group, the group represented by —O—, and groups represented by —NR— (R represents a hydrogen atom, an alkyl group, a phenyl group, or an aralkyl group). The divalent linking group is preferably an alkylene group, an amide group, or an ester group and is more preferably an ester group. When $L^1$ is a divalent linking group and this divalent linking group is an ester group, the monomer unit (a) is then the monomer unit (a-1) represented by the following formula (a-1).

An example of a method for introducing the monomer unit (a) into the crystalline resin A is the introduction into a vinyl polymerization of a monomer such as an α-olefin and β-olefin having a long-chain alkyl group having 16 to 36 carbon atoms, (meth)acrylate ester having a long-chain alkyl group having 16 to 36 carbon atoms, N-alkylacrylamide having a long-chain alkyl group having 16 to 36 carbon atoms, and so forth.

Among monomer units (a), the monomer unit (a-1) represented by formula (a-1) is preferred for the ease of control of the SP value and the ease of control of the properties of the crystalline resin A, i.e., the melting point.

(a-1)

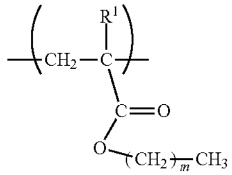

In formula (a-1), $R^1$ represents a hydrogen atom or a methyl group and m represents an integer from 15 to 35 (preferably 15 to 30, more preferably 17 to 29, and still more preferably 19 to 23).

An example of a method for introducing the monomer unit (a-1) represented by formula (a-1) is the introduction into a vinyl polymerization of a (meth)acrylate ester as shown in the following examples.

The following monomers are examples: (meth)acrylate esters having a linear alkyl group having 16 to 36 carbon atoms [e.g., stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth) acrylate, and dotriacontyl (meth)acrylate] and (meth)acrylate esters having a branched alkyl group having 18 to 36 carbon atoms [e.g., 2-decyltetradecyl (meth)acrylate].

A single monomer that forms the monomer unit (a) may be used by itself or two or more may be used in combination, and a single monomer that forms the monomer unit (a-1) may be used by itself or two or more may be used in combination.

The crystalline resin A may also contain another monomer unit besides the monomer unit (a). An example of a method for introducing this additional monomer unit is to carry out polymerization of another vinyl monomer with monomer as provided above as examples.

Examples of the other vinyl monomer include the followings.

(Meth)acrylic acid esters such as styrene, α-methylstyrene, methyl (meth)acrylate, ethyl (meth)acrylate, n-butyl (meth)acrylate, t-butyl (meth)acrylate, and 2-ethylhexyl (meth)acrylate.

Monomers that have a urea group, such as monomers obtained by causing a reaction between an amine having 3 to 22 carbon atoms [e.g., a primary amine (normal-butylamine, t-butylamine, propylamine, isopropylamine, etc.), a secondary amine (di-normal-ethylamine, di-normal-propylamine, di-normal-butylamine, etc.), aniline, cycloxyl amine, etc.] and an isocyanate that has an ethylenically unsaturated bond and 2 to 30 carbon atoms, by using a known method.

Monomers that have a carboxy group, such as methacrylic acid, acrylic acid, and 2-carboxyethyl (meth)acrylate.

Monomers that have a hydroxy group, such as 2-hydroxyethyl (meth)acrylate and 2-hydroxypropyl (meth)acrylate.

Monomers that have an amide group, such as acrylamides and monomers obtained by causing a reaction between an amine having 1 to 30 carbon atoms and a carboxylic acid (acrylic acid, methacrylic acid, etc.) that has an ethylenically unsaturated bond and 2 to 30 caron atoms, by using a known method.

Monomers that have a nitrile group, such as acrylonitrile and methacrylonitrile.

Monomers that have a urethane group: for example, monomers provided by the reaction by a known method of an alcohol having 2 to 22 carbon atoms and an ethylenically unsaturated bond (e.g., 2-hydroxyethyl methacrylate and vinyl alcohol) with an isocyanate having 1 to 30 carbon atoms [e.g., monoisocyanate compounds (e.g., benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, and 2,6-dipropylphenyl isocyanate), aliphatic diisocyanate compounds (e.g., trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate), alicyclic diisocyanate compounds (e.g., 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate), and aromatic diisocyanate compounds (e.g., phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate)], and monomers provided by the reaction by a known method between an alcohol having 1 to 26 carbon atoms (e.g., methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, erucyl alcohol) and an isocyanate having 2 to 30 carbon atoms and containing an ethylenically unsaturated bond [e.g., 2-isocyanatoethyl (meth)acrylate, 240-[1'-methylpropylideneamino] carboxyamino)ethyl (meth)acrylate, 2-R3,5-dimethylpyrazolyl)carbonylaminolethyl (meth)acrylate, and 1,1-(bis (meth)acryloyloxymethyl)ethyl isocyanate].

Vinyl esters: vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate, vinyl octylate. Among the preceding, the use is preferred of styrene, methacrylic acid, acrylic acid, methyl (meth)acrylate, and t-butyl (meth)acrylate.

The content of the monomer unit (a) in the crystalline resin A is 50.0 to 100.0 mass %. When the monomer unit (a) content is less than 50.0 mass %, exhibition of the sharp melt property of the crystalline resin A itself is impeded and the low-temperature fixability is impaired. The lower limit is more preferably 60.0 mass % or more, even more preferably 65.0 mass % or more, and still more preferably 70.0 mass % or more. Viewed from the standpoint of the low-temperature fixability, the upper limit is more preferably 95.0 mass % or less, still more preferably 90.0 mass % or less, and even more preferably 85.0 mass % or less. The following, for example, are preferred: 50.0 to 90.0 mass %, 60.0 to 95.0 mass %, 65.0 to 90.0 mass %, and 70.0 to 85.0 mass %.

The content of the monomer unit (a) in the crystalline resin A can be adjusted by changing the amount of monomer that forms the monomer unit (a). When two or more species of monomer unit (a) are present in the crystalline resin A, the content of the monomer unit (a) is then their sum.

The crystalline resin A preferably has a monomer unit derived from a styrene represented by the following formula (A). In addition, the crystalline resin A preferably has a monomer unit derived from the (meth)acrylic acid represented by the following formula (B). The crystalline resin A may have the monomer unit derived from (meth)acrylonitrile represented by the following formula (C).

(A)

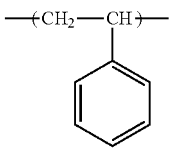

(B)

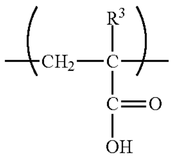

-continued (C)

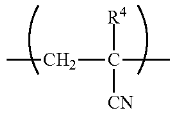

The $R^3$ in formula (B) represents a hydrogen atom or methyl group. $R^3$ is preferably a methyl group. The $R^4$ in formula (C) represents a hydrogen atom or methyl group. $R^4$ is preferably a methyl group.

The content of the monomer unit derived from a styrene in the crystalline resin A is preferably 1.0 to 50.0 mass %, more preferably 3.0 to 46.0 mass %, still more preferably 10.0 to 30.0 mass %, and particularly preferably 15.0 to 27.0 mass %. The content of the monomer unit derived from (meth)acrylic acid (preferably methacrylic acid) in the crystalline resin A is preferably 1.0 to 5.0 mass %, more preferably 1.0 to 3.0 mass %, and still more preferably 1.5 to 2.5 mass %. The content of the monomer unit derived from a (meth)acrylonitrile (preferably methacrylonitrile) in the crystalline resin A is preferably 1.0 to 30.0 mass %, more preferably 5.0 to 25.0 mass %, and still more preferably 10.0 to 20.0 mass %.

The content of the crystalline resin A in the nonmagnetic toner is 10.0 to 58.0 mass %. When the crystalline resin A content is less than 10.0 mass %, the nonmagnetic toner is inadequately endowed with the sharp melt property and the low-temperature fixability and heat-resistant storability decline. When the crystalline resin A content is more than 58.0 mass %, the brittleness due to the side-chain crystalline resin becomes prominent and the durability declines.

From a similar perspective, the lower limit is preferably 15.0 mass % or more, more preferably 25.0 mass % or more, and still more preferably 30.0 mass % or more, while the upper limit is preferably 55.0 mass % or less, more preferably 52.0 mass % or less, and still more preferably 50.0 mass % or less. The following, for example, are preferred: 15.0 to 55.0 mass %, 25.0 to 52.0 mass %, 30.0 to 50.0 mass %, and 30.0 to 55.0 mass %.

The nonmagnetic toner particle comprises an amorphous resin B in addition to the crystalline resin A. The incorporation of the amorphous resin B in the nonmagnetic toner particle functions to provide a nonmagnetic toner that exhibits an excellent durability and also an excellent charge rise performance. The amorphous resin B has a monomer unit (b) represented by the following formula (b).

(b)

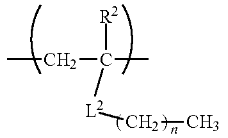

In formula (b), $R^2$ represents a hydrogen atom or a methyl group, $L^2$ represents a single bond or a divalent linking group, and n represents an integer from 10 to 30.

As described above, it is thought that the presence of the monomer unit (b) in the amorphous resin B functions to improve the crystallinity at the crystalline resin A and the amorphous resin B interface and to enhance the charge rise performance.

From the standpoint of promoting crystallization at the interface, n is preferably in the range of 10 to 29, more preferably 10 to 19, still more preferably 10 to 15, even more preferably 10 to 14, and particularly preferably 10 to 13.

The resin exhibits an amorphous character—and the amorphous resin B can thus be provided—by having the resin have the monomer unit (b) represented by formula (b) and having n be in the above range. Adjusting the content of the monomer unit (b), infra, is also effective for adjusting the amorphous character of the resin.

When the $L^2$ in formula (b) is a divalent linking group, there are no particular limitations on this divalent linking group, but the same divalent linking groups as for the $L^1$ in formula (a) can preferably be used. When $L^2$ is a divalent linking group and this divalent linking group is an ester group, the monomer unit (b) is then the monomer unit (b-1) represented by the following formula (b-1).

An example of a method for introducing the monomer unit (b) into the amorphous resin B is the introduction into a vinyl polymerization of a monomer such as an α-olefin and β-olefin having a long-chain alkyl group having 11 to 31 carbon atoms, (meth)acrylate ester having a long-chain alkyl group having 11 to 31 carbon atoms, N-alkylacrylamide having a long-chain alkyl group having 11 to 31 carbon atoms, and so forth.

Among monomer units (b), the monomer unit (b-1) represented by formula (b-1) is preferred for the ease of control of the SP value and the ease of control of the properties of the amorphous resin B, i.e., the melting point.

(b-1)

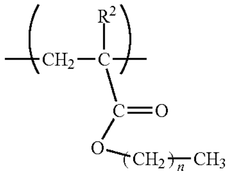

In formula (b-1), $R^2$ represents a hydrogen atom or a methyl group and n represents an integer from 10 to 30 (preferably 10 to 29, more preferably 10 to 19, still more preferably 10 to 15, even more preferably 10 to 14, and particularly preferably 10 to 13).

A (meth)acrylate ester having a linear alkyl group having 11 to 31 carbon atoms may be used as monomer as a method for introducing the monomer unit (b-1) represented by the formula (b-1). For example, monomer that forms the monomer unit (b-1) as indicated in the following may be used in addition to monomer that can be used for the monomer unit (a-1) as described above. Examples here are octyl (meth) acrylate, decyl (meth)acrylate, lauryl (meth)acrylate, myristyl (meth)acrylate, and palmityl (meth)acrylate. A single monomer that forms the monomer unit (b) may be used by itself or two or more may be used in combination, and a single monomer that forms the monomer unit (b-1) may be used by itself or two or more may be used in combination.

The amorphous resin B may also have another monomer unit besides the monomer unit (b). An example of a method for introducing this additional unit is the execution of polymerization between monomer that forms monomer unit (b) and a vinyl monomer that can be used for the crystalline resin A as described above.

The amorphous resin B preferably has at least one monomer unit Y selected from the group consisting of a monomer unit derived from a styrene represented by the following formula (D) and a monomer unit derived from an alkyl (meth)acrylate ester represented by the following formula (E). The amorphous resin B may have a monomer unit derived from (meth)acrylonitrile represented by the following formula (F).

(D)

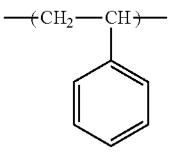

(E)

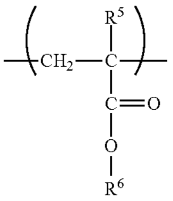

(F)

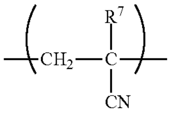

In formula (E), $R^5$ represents a hydrogen atom or methyl group and $R^6$ represents an alkyl group having 1 to 8 (preferably 1 to 6 and more preferably 1 to 4) carbon atoms. $R^5$ is preferably a methyl group. The $R^7$ in formula (F) represents a hydrogen atom or methyl group. $R^7$ is preferably a methyl group.

The content of the monomer unit (b) in the amorphous resin B is preferably 2.7 to 50.0 mass %, more preferably 3.0 to 43.0 mass %, and still more preferably 5.0 to 40.0 mass %. The lower limit is preferably equal to or greater than 10.0 mass %, particularly preferably equal to or greater than 15.0 mass %, and especially preferably equal to or greater than 20.0 mass %. The upper limit is more preferably equal to or less than 35.0 mass % and particularly preferably equal to or less than 30.0 mass %. The following, for example, are preferred: 5.0 to 30.0 mass %, 10.0 to 35.0 mass %, 15.0 to 30.0 mass %, and 20.0 to 30.0 mass %.

Having the monomer unit (b) content be in the above range facilitates the appearance of an amorphous character for the resin and thus facilitates providing the amorphous resin B. In addition, the charge rise performance will co-exist with the durability at high levels for each. The content of the monomer unit (b) in the amorphous resin B can be adjusted by changing the amount of monomer that forms the monomer unit (b).

The content in the amorphous resin B of the at least one monomer unit Y selected from the group consisting of the monomer unit derived from a styrene represented by formula (D) and the monomer unit derived from an alkyl (meth)acrylate ester represented by formula (E) is preferably 50.0 to 97.0 mass %, more preferably 60.0 to 90.0 mass %, still more preferably 65.0 to 85.0 mass %, and even more preferably 70.0 to 80.0 mass %. The content of the monomer unit derived from a (meth)acrylonitrile (preferably methacrylonitrile) in the amorphous resin B is preferably 1.0 to 30.0 mass %, more preferably 5.0 to 25.0 mass %, and still more preferably 10.0 to 20.0 mass %.

The content of the amorphous resin B in the nonmagnetic toner is preferably 26.0 to 90.0 mass %, more preferably 30.0 to 90.0 mass %, still more preferably 40.0 to mass %, even more preferably 40.0 to 75.0 mass %, and particularly preferably 40.0 to 60.0 mass %. By having the amorphous resin B content be in the above range, the low-temperature fixability and durability can co-exist at high levels for each.

The sum of the contents of the crystalline resin A and the amorphous resin B in the nonmagnetic toner is at least 65.0 mass %. The sum of the contents of the crystalline resin A and the amorphous resin B in the nonmagnetic toner is preferably to 100.0 mass %, more preferably 66.4 to 95.0 mass %, and still more preferably to 90.0 mass %. Having the sum of the contents of the crystalline resin A and the amorphous resin B be in the above range indicates that crystalline resin A and the amorphous resin B are the main component of the nonmagnetic toner, as a consequence of which the low-temperature fixability, heat-resistant storability, and fixing performance can co-exist with the charge rise performance at high levels for all.

The glass transition temperature Tg of the amorphous resin B is preferably to 90.0° C. When the amorphous resin B exhibits a Tg, this indicates that the amorphous resin B is an amorphous resin that resides in a glassy state in the normal temperature region, and the durability of the nonmagnetic toner is improved by this. In addition, the Tg is preferably in the indicated range from the standpoints of the low-temperature fixability and heat-resistant storability. The glass transition temperature Tg of the amorphous resin B can be adjusted by altering the composition of the amorphous resin B.

Using SPA $[(J/cm^3)^{0.5}]$ for a SP value of the crystalline resin A and using SPB $[(J/cm^3)^{0.5}]$ for a SP value of the amorphous resin B, SPA and SPB satisfy $0.15 \leq SPB-SPA \leq 2.00$. The SP value, also referred to as the solubility parameter, is a numerical value used as an index of affinity or solubility; it shows to what extent a particular substance dissolves in a particular substance. When two SP values are near each other, the solubility or affinity is higher; when the SP values are separated, the solubility or affinity is lower.

SPB−SPA indicates the difference between the SP values of the crystalline resin A and the amorphous resin B, i.e., indicates the magnitude of the affinity between the crystalline resin A and the amorphous resin B. When SPB−SPA is less than 0.15, the compatibility between the two is too good and they undergo compatibilization as a consequence, the interfacial region of low crystallinity ends up becoming large, and the durability and charge rise performance are not adequately improved as a result.

When SPB−SPA is larger than 2.00, the compatibility between the two is poor and the crystalline resin A, which is a side-chain crystalline resin, forms large domains in the nonmagnetic toner and is prone to be present as such and the nonmagnetic toner ends up becoming brittle. The low-temperature fixability and durability are not adequately improved as a result.

SPB−SPA is preferably $0.20 \leq SPB-SPA \leq 1.60$, more preferably $0.60 \leq SPB-SPA \leq 1.30$, and still more preferably $0.80 \leq SPB-SPA \leq 1.20$. SPA and SPB can be controlled by changes in the composition of the crystalline resin A and the composition of the amorphous resin B.

There is no particular limitation on the SPA of the crystalline resin as long as SPA and SPB reside in the relationship indicated above, but SPA is preferably 17.00 to 20.00, more preferably 17.50 to 19.50, still more preferably 18.00 to 19.00, and particularly preferably 18.20 to 18.80.

In addition to the crystalline resin A and amorphous resin B, the nonmagnetic toner may contain another resin component in pursuit of various objectives. Examples of usable resins are vinyl resins that do not correspond to crystalline resin A or amorphous resin B, a polyester, a polyurethane, and an epoxy resin, with a polyester being preferred. For example, the crystalline resin A, amorphous resin B, and another resin may be binder resins. Polymerizable monomer that forms a vinyl resin that does not correspond to the crystalline resin A or amorphous resin B can be exemplified by polymerizable monomers, among those already provided above, other than those that form the monomer unit (a) or monomer unit (b). A combination of two or more may be used as necessary.

The polyester can be obtained by the condensation polymerization reaction of an at least dibasic polybasic carboxylic acid with a polyhydric alcohol. The polycarboxylic acid can be exemplified by the following compounds: dibasic acids, e.g., succinic acid, adipic acid, sebacic acid, phthalic acid, isophthalic acid, terephthalic acid, malonic acid, and dodecenylsuccinic acid and their anhydrides and lower alkyl esters; aliphatic unsaturated dicarboxylic acids, e.g., maleic acid, fumaric acid, itaconic acid, and citraconic acid; and 1,2,4-benzenetricarboxylic acid (trimellitic acid) and 1,2,5-benzenetricarboxylic acid and their anhydrides and lower alkyl esters. Terephthalic acid, isophthalic acid, and trimellitic anhydride are preferred. A single one of these may be used by itself or two or more may be used in combination.

The polyhydric alcohol can be exemplified by the following compounds: alkylene glycols (ethylene glycol, 1,2-propylene glycol, and 1,3-propylene glycol), alkylene ether glycols (polyethylene glycol and polypropylene glycol), alicyclic diols (1,4-cyclohexanedimethanol), bisphenols (bisphenol A), alkylene oxide (ethylene oxide or propylene oxide) adducts on alicyclic diols; and alkylene oxide (ethylene oxide or propylene oxide) adducts on bisphenols, such as the adduct of 2 moles propylene oxide on bisphenol A. The alkyl moiety of the alkylene glycol and alkylene ether glycol may be straight chain or branched. The alkylene oxide adducts on bisphenols are preferred, and the adduct of 2 moles propylene oxide on bisphenol A is more preferred.

Alkylene glycols having a branched structure can also be preferably used. Examples in this regard are glycerol, trimethylolethane, trimethylolpropane, and pentaerythritol. A single one of these may be used by itself or two or more may be used in combination.

As necessary, a monobasic acid such as acetic acid or benzoic acid and a monohydric alcohol such as cyclohexanol or benzyl alcohol may also be used for the purpose of adjusting the acid value or hydroxyl value. The method for producing the polyester is not particularly limited and can be exemplified by ester exchange methods and direct polycondensation methods.

The polyurethane is obtained by the reaction of a diol component and a diisocyanate component. The diisocyanate component can be exemplified by the following: aromatic diisocyanates having from 6 to 20 carbon atoms (excluding the carbon in the NCO group, the same applies in the following), aliphatic diisocyanates having from 2 to 18 carbon atoms, and alicyclic diisocyanates having from 4 to 15 carbon atoms, as well as modifications of these diisocyanates (modifications that contain the urethane group, carbodiimide group, allophanate group, urea group, biuret group, uretdione group, uretoimine group, isocyanurate group, or oxazolidone group, also referred to herebelow as "modified diisocyanate") and mixtures of two or more of the preceding.

The following are examples of the aromatic diisocyanates: m- and/or p-xylylene diisocyanate (XDI) and α,α,α',α'-tetramethylxylylene diisocyanate. The following are examples of the aliphatic diisocyanates: ethylene diisocyanate, tetramethylene diisocyanate, hexamethylene diisocyanate (HDI), and dodecamethylene diisocyanate. The following are examples of the alicyclic diisocyanates: isophorone diisocyanate (IPDI), dicyclohexylmethane-4,4'-diisocyanate, cyclohexylene diisocyanate, and methylcyclohexylene diisocyanate.

Preferred among the preceding are aromatic diisocyanates having from 6 to 15 carbon atoms, aliphatic diisocyanates having from 4 to 12 carbon atoms, and alicyclic diisocyanates having from 4 to 15 carbon atoms, wherein XDI, IPDI, and HDI are particularly preferred. A trifunctional or higher functional isocyanate compound may also be used in addition to the diisocyanate component. The same dihydric alcohols usable for the polyester as described above can be adopted for the diol component that can be used for the polyurethane.

The weight-average molecular weight (Mw) of the tetrahydrofuran (THF)-soluble matter of the nonmagnetic toner, as measured by gel permeation chromatography (GPC), is preferably 10,000 to 200,000. The lower limit is more preferably 30,000 or more, still more preferably 50,000 or more, even more preferably 80,000 or more, and particularly preferably 90,000 or more. The upper limit is more preferably 180,000 or less, still more preferably 150,000 or less, even more preferably 130,000 or less, and particularly preferably 120,000 or less. Examples are 30,000 to 180,000, 50,000 to 150,000, 80,000 to 130,000, and 90,000 to 120,000. Improving the durability of the nonmagnetic toner is facilitated by having Mw be in the above range.

The nonmagnetic toner may contain a release agent. The release agent is preferably at least one selected from the group consisting of a hydrocarbon wax and an ester wax. Use of a hydrocarbon wax and/or an ester wax makes it easy to achieve effective releasability.

The hydrocarbon wax is not particularly limited, but examples thereof are as follows. Aliphatic hydrocarbon waxes: low molecular weight polyethylene, low molecular weight polypropylene, low molecular weight olefin copolymers, Fischer Tropsch waxes, and waxes obtained by subjecting these to oxidation or acid addition.

The ester wax should have at least one ester bond per molecule, and may be a natural ester wax or a synthetic ester wax. Ester waxes are not particularly limited, but examples thereof are as follows: Esters of a monohydric alcohol and a monocarboxylic acid, such as behenyl behenate, stearyl stearate and palmityl palmitate; Esters of a dicarboxylic acid and a monoalcohol, such as dibehenyl sebacate; Esters of a dihydric alcohol and a monocarboxylic acid, such as ethylene glycol distearate and hexane diol dibehenate; Esters of a trihydric alcohol and a monocarboxylic acid, such as glycerol tribehenate; Esters of a tetrahydric alcohol and a monocarboxylic acid, such as pentaerythritol tetrastearate and pentaerythritol tetrapalmitate; Esters of a hexahydric alcohol and a monocarboxylic acid, such as dipentaerythritol hexastearate, dipentaerythritol hexapalmitate and dipentaerythritol hexabehenate; Esters of a polyfunctional alcohol and a monocarboxylic acid, such as polyglycerol behenate; and natural ester waxes such as carnauba wax and rice wax.

Of these, esters of a hexahydric alcohol and a monocarboxylic acid, such as dipentaerythritol hexastearate, dipentaerythritol hexapalmitate and dipentaerythritol hexabehenate, are preferred.

The release agent may be a hydrocarbon-based wax or an ester wax in isolation, a combination of a hydrocarbon-based wax and an ester wax, or a mixture of two or more types of each, but it is preferable to use a hydrocarbon-based wax in isolation or two or more types thereof. It is more preferable for the release agent to be a hydrocarbon wax.

In the nonmagnetic toner, the release agent has a content of preferably from 1.0 mass % to 30.0 mass %, or more preferably from 2.0 mass % to 25.0 mass % in the nonmagnetic toner particle. If the content of the release agent in the nonmagnetic toner particle is within this range, the release properties are easier to secure during fixing. The melting point of the release agent is preferably from 60° C. to 120° C. If the melting point of the release agent is within this range, it is more easily melted and exuded on the nonmagnetic toner particle surface during fixing, and is more likely to provide release effects. The melting point is more preferably from 70° C. to 100° C.

The toner according to the present disclosure is a nonmagnetic toner that comprises a nonmagnetic toner particle that comprises a colorant. The colorant can be exemplified by known organic pigments, organic dyes, and inorganic pigments, and by carbon black as a black colorant. In addition to these, those colorants conventionally used in nonmagnetic toners may be used. Yellow colorants can be exemplified by the following: condensed azo compounds, isoindolinone compounds, anthraquinone compounds, azometal complexes, methine compounds, and allylamide compounds. In specific terms, the following are advantageously used: C. I. Pigment Yellow 12, 13, 14, 17, 62, 74, 83, 93, 94, 95, 109, 110, 111, 128, 129, 147, 155, 168, and 180.

Magenta colorants can be exemplified by the following: condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. In specific terms, the following are advantageously used: C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

Cyan colorants can be exemplified by copper phthalocyanine compounds and derivatives thereof, anthraquinone compounds, and basic dye lake compounds. In specific terms, the following are advantageously used: C. I. Pigment Blue 1, 7, 15, 15:1, 15:3, 15:4, 60, 62, and 66.

The colorant is selected considering the hue angle, chroma, lightness, lightfastness, OHP transparency, and dispersibility in the nonmagnetic toner. The content of the colorant is preferably from 1.0 mass parts to 20.0 mass parts relative to 100.0 mass parts of the binder resin.

The nonmagnetic toner particle may comprise a charge control agent on an optional basis. In addition, a charge control agent may be externally added to the nonmagnetic toner particle. The incorporation of a charge control agent supports a stabilization of the charging characteristics and supports control of the optimal triboelectric charge quantity in correspondence to the developing system. A known charge control agent can be used as this charge control agent, and a charge control agent is preferred that in particular can provide a fast charging speed and can stably maintain a constant charge quantity.

Charge control agents that control the nonmagnetic toner to a negative chargeability can be exemplified as follows. Organometal compounds and chelate compounds are effective, for example, monoazo metal compounds, acetylacetone-metal compounds, and metal compounds of aromatic oxycarboxylic acids, aromatic dicarboxylic acids, oxycarboxylic acids, and dicarboxylic acids. The following are examples of charge control agents that control the nonmagnetic toner to a positive chargeability: nigrosine, quaternary ammonium salts, metal salts of higher fatty acids, diorganotin borates, guanidine compounds, and imidazole compounds.

The content of the charge control agent, expressed per 100.0 mass parts of the nonmagnetic toner particle, is preferably from 0.01 mass parts to 20.0 mass parts and more preferably from 0.5 mass parts to 10.0 mass parts.

The nonmagnetic toner particle as such may be used as a nonmagnetic toner, but may optionally be made into a nonmagnetic toner by mixing with, e.g., an external additive, to attach same to the nonmagnetic toner particle surface. The external additive can be exemplified by inorganic fine particles selected from the group consisting of silica fine particles, alumina fine particles, and titania fine particles, and by the composite oxides thereof. The composite oxides can be exemplified by silica-aluminum fine particles and strontium titanate fine particles. The content of the external additive, per 100 mass parts of the nonmagnetic toner particle, is preferably from 0.01 mass parts to 8.0 mass parts and is more preferably from 0.1 mass parts to 4.0 mass parts.

Within the scope of the present configuration, the nonmagnetic toner particle may be manufactured by any known conventional method such as suspension polymerization, emulsion aggregation, dissolution suspension or pulverization, but is preferably manufactured by a suspension polymerization method.

The following describes the suspension polymerization method in detail. A polymerizable monomer composition is prepared by, for example, mixing the crystalline resin A synthesized in advance and polymerizable monomers for generating the amorphous resin B, and other materials such as a colorant, a release agent, and a charge control agent, as necessary, and uniformly dissolving or dispersing the materials.

Thereafter, the polymerizable monomer composition is dispersed in an aqueous medium using a stirrer or the like to prepare a suspended particle of the polymerizable monomer composition. Thereafter, the polymerizable monomers contained in the particle are polymerized using an initiator or the like to obtain a nonmagnetic toner particle. After polymerization has finished, the nonmagnetic toner particle is filtered, washed, and dried using known methods, and an external additive is added as necessary to obtain the nonmagnetic toner.

A known polymerization initiator may be used. Examples of the polymerization initiator include: azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide polymerization initiators such as benzoyl peroxide, t-butyl peroxy-2-ethylhexanoate, t-butyl peroxypivalate, t-butyl peroxyisobutyrate, t-butyl peroxyneodecanoate, methylethylketone peroxide, diisopropyl peroxycarbonate, cumene hydroperoxide, 2,4-dichlorobenzoyl peroxide, and lauroyl peroxide. Also, a known chain transfer agent and a known polymerization inhibitor may be used.

The aqueous medium may contain an inorganic or organic dispersion stabilizer. A known dispersion stabilizer may be used. Examples of inorganic dispersion stabilizers include: phosphates such as hydroxyapatite, tribasic calcium phosphate, dibasic calcium phosphate, magnesium phosphate, aluminum phosphate, and zinc phosphate; carbonates such as calcium carbonate and magnesium carbonate; metal hydroxides such as calcium hydroxide, magnesium hydroxide, and aluminum hydroxide; sulfates such as calcium sulfate and barium sulfate; calcium metasilicate; bentonite; silica; and alumina.

On the other hand, examples of organic dispersion stabilizers include polyvinyl alcohol, gelatin, methyl cellulose, methyl hydroxypropyl cellulose, ethyl cellulose, sodium salts of carboxymethyl cellulose, polyacrylic acid and salts thereof, and starch.

In the case where an inorganic compound is used as the dispersion stabilizer, a commercially available inorganic compound may be used as is, or the inorganic compound may be generated in an aqueous medium to obtain a finer particle. For example, in the case of calcium phosphate such as hydroxyapatite or tribasic calcium phosphate, an aqueous solution of the phosphate and an aqueous solution of a calcium salt may be mixed under high-speed stirring conditions.

The aqueous medium may contain a surfactant. A known surfactant may be used. Examples of the surfactant include: anionic surfactants such as sodium dodecylbenzenesulfate and sodium oleate; cationic surfactants; amphoteric surfactants; and nonionic surfactants.

The method for manufacturing the nonmagnetic toner using the pulverization method is not particularly limited, but preferably includes: a step of melt-kneading raw materials including the crystalline resin A and the amorphous resin B and also including a colorant, a release agent, and the like as necessary; and a step of pulverizing the obtained melt-kneaded product to obtain a nonmagnetic toner particle. Known apparatuses may be used for melt-kneading and pulverization.

The emulsion aggregation method is not particularly limited, but preferably includes: a dispersion step of preparing solutions in which fine particles of raw materials (the crystalline resin A, the amorphous resin B, and a colorant, a release agent, etc., as necessary) of a nonmagnetic toner particle are dispersed; an aggregation step of causing aggregation of the fine particles of raw materials of a nonmagnetic toner particle and controlling the particle diameter of an aggregated particle until the particle diameter reaches the particle diameter of a nonmagnetic toner particle; and a melt adhesion step of causing melt adhesion of the resins contained in the obtained aggregated particle to obtain a nonmagnetic toner particle.

A nonmagnetic toner particle may also be obtained by performing, as necessary, a cooling step after the above-described step, filtration, a metal removal step of removing excessive polyvalent metal ions, a filtration and washing step of washing the nonmagnetic toner particle with ion exchange water or the like, and a drying step of removing moisture from the washed nonmagnetic toner particle.

The following describes methods for calculating and measuring various physical properties.

Method for Measuring Molecular Weight of Nonmagnetic Toner

The molecular weight (weight-average molecular weight Mw) of THF-soluble matter in the nonmagnetic toner is measured using gel permeation chromatography (GPC) as described below. First, the nonmagnetic toner is dissolved in tetrahydrofuran (THF) at room temperature over the course of 24 hours. The resulting solution is filtered through a solvent-resistant membrane filter (Maishori Disk, Tosoh Corp.) having a pore diameter of 0.2 μm to obtain a sample solution. The concentration of THF-soluble components in the sample solution is adjusted to about 0.8 mass %. Measurement is performed under the following conditions using this sample solution.

Device: HLC8120 GPC (detector: RI) (Tosoh Corp.)
Columns: Shodex KF-801, 802, 803, 804, 805, 806, 807 (total 7) (Showa Denko)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (such as TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the molecular weights of the samples.

Method for Separating Crystalline Resin A and Amorphous Resin B from Nonmagnetic Toner The crystalline resin A and the amorphous resin B can be separated from the nonmagnetic toner using a known method, and the following describes an example of such a method. Gradient LC is used as a method for separating resin components from the nonmagnetic toner. With this analysis, it is possible to separate resins included in the binder resin in accordance with polarities of the resins, irrespective of molecular weights.

First, the nonmagnetic toner is dissolved in chloroform. Measurement is carried out using a sample that is prepared by adjusting the concentration of the sample to 0.1 mass % using chloroform and filtering the solution using a 0.45-μm PTFE filter. Gradient polymer LC measurement conditions are shown below.

Apparatus: UltiMate 3000 (manufactured by Thermo Fisher Scientific Inc.)

Mobile phase: A chloroform (HPLC), B acetonitrile (HPLC)

Gradient: 2 min (A/B=0/100)→25 min (A/B=100/0)

(The gradient of the change in mobile phase was adjusted to be linear.)

Flow rate: 1.0 mL/min
Injection: 0.1 mass %×20 μL
Column: Tosoh TSKgel ODS (4.6 mm×150 mm×5 μm)
Column temperature: 40° C.
Detector: Corona charged particle detector (Corona-CAD) (manufactured by Thermo Fisher Scientific Inc.)

In a time-intensity graph obtained through the measurement, the resin components can be separated into two peaks in accordance with their polarities. It is possible to separate the two types of resins by thereafter carrying out the above-described measurement again and performing isolation at times corresponding to valleys after the respective peaks. DSC measurement and $^1$H-NMR measurement are performed on the separated resins. Based on the result of the measurements, the crystalline resin A and the amorphous resin B are attributed.

In the case where other resin is contained separately from the crystalline resin A and the amorphous resin B, separation can be performed by performing separation by the Gradient LC, DSC measurement, and $^1$H-NMR measurement.

Note that if the nonmagnetic toner contains a release agent, it is necessary to separate the release agent from the nonmagnetic toner. The release agent is separated by separating components having a molecular weight of 2000 or less using recycle HPLC. The following describes a measurement method. First, a chloroform solution of the nonmagnetic toner is prepared using the above-described method. The obtained solution is filtered using a solvent-resistant membrane filter "Maishori Disk" (manufactured by Tosoh Corporation) having a pore diameter of 0.2 μm to obtain a sample solution. Note that the concentration of chloroform-soluble matter in the sample solution is adjusted to 1.0 mass %. Measurement is carried out using the sample solution under the following conditions.

Apparatus: LC-Sakura NEXT (manufactured by Japan Analytical Industry Co., Ltd.)

Column: JAIGEL2H, 4H (manufactured by Japan Analytical Industry Co., Ltd.)

Eluent: chloroform

Flow rate: 10.0 ml/min

Oven temperature: 40.0° C.

Sample injection amount: 1.0 ml

The molecular weight of the sample is calculated using a molecular weight calibration curve obtained using standard polystyrene resins (e.g., "TSK standard polystyrene F-850, F-450, F-288, F-128, F-80, F-40, F-20, F-10, F-4, F-2, F-1, A-5000, A-2500, A-1000, A-500" (product name) manufactured by Tosoh Corporation). The release agent is removed from the nonmagnetic toner by repeatedly performing isolation of components having a molecular weight of 2000 or less using the obtained molecular weight curve.

Method for Measuring Percentages of Contents of Various Monomer Units in Resin

The percentages of contents of various monomer units in a resin are measured using $^1$H-NMR under the following conditions. The crystalline resin A and the amorphous resin B isolated using the above-described method can be used as measurement samples.

Measurement apparatus: FT NMR apparatus JNM-EX400 (manufactured by JEOL Ltd.)

Measurement frequency: 400 MHz

Pulse condition: 5.0 μs

Frequency range: 10500 Hz

Cumulative number of times: 64 times

Measurement temperature: 30° C.

Sample: Prepared by placing 50 mg of a measurement sample in a sample tube having an inner diameter of 5 mm, adding deuterated chloroform ($CDCl_3$) as a solvent, and dissolving the measurement sample in a thermostatic chamber at 40° C. The structure of each monomer unit is identified by analyzing an obtained $^1$H-NMR chart. By this identification, it can be confirmed that the crystalline resin A and the amorphous resin B have each monomer unit. The following describes measurement of the percentage of the content of the monomer unit (a) in the crystalline resin A as an example. In the obtained $^1$H-NMR chart, a peak that is independent of peaks attributed to constituents of other monomer units is selected from among peaks attributed to constituents of the monomer unit (a), and an integration value S1 of the selected peak is calculated. An integration value is also calculated in the same manner with respect to other monomer units included in the crystalline resin A.

If monomer units constituting the crystalline resin A are the monomer unit (a) and another monomer unit, the percentage of the content of the monomer unit (a) is determined using the integration value S1 and an integration value S2 of a peak calculated for the other monomer unit. Note that n1 and n2 each represent the number of hydrogen atoms included in a constituent to which the peak focused on with respect to the corresponding unit is attributed.

$$\text{Percentage (mol \%) of content of monomer unit } (a)=\{(S1/n1)/((S1/n1)+(S2/n2))\}\times 100$$

In cases where the crystalline resin A includes two or more types of other monomer units, the percentage of the content of the monomer unit (a) can be calculated in the same manner (using S3 . . . Sx and n3 . . . nx).

If a polymerizable monomer that does not include a hydrogen atom in constituents other than a vinyl group is used, measurement is carried out using $^{13}$C-NMR and setting the measurement atomic nucleus to $^{13}$C in a single pulse mode, and calculation is performed in the same manner using $^{1}$H-NMR. The percentage of the content of each monomer unit is converted to a value expressed in mass % by multiplying the percentage (mol %) of the monomer unit calculated as described above by the molecular weight of the monomer unit. Measurement is carried out for the amorphous resin B as well using the same method.

Measurement of Percentage of Content of Crystalline Resin A and Amorphous Resin B in Nonmagnetic Toner The percentage of the content of the crystalline resin A and the amorphous resin B in the nonmagnetic toner is calculated based on the mass of the nonmagnetic toner before the nonmagnetic toner is dissolved in chloroform, the mass of the separated crystalline resin A and amorphous resin B in the above-described method for separating the crystalline resin A and the amorphous resin B from the nonmagnetic toner.

Method for Calculating SPA and SPB

SPA and SPB are determined proceeding as follows using the calculation method proposed by Fedors. The energy of vaporization (Δei) (cal/mol) and the molar volume (Δvi) ($cm^3$/mol) are determined from the tables given in "Polym. Eng. Sci., 14(2), 147-154 (1974)" for the atoms or atomic groups in each molecular structure, and $(4.184\times\Sigma\Delta ei/\Sigma\Delta vi)^{0.5}$ is used for the SP value $(J/cm^3)^{0.5}$.

Specifically, the energy of vaporization (Δei) and the molar volume (Δvi) of the monomer units corresponding to the monomers that constitute the crystalline resin A or the amorphous resin B are determined for each monomer unit; each product with the molar ratio (j) in the resin A of each monomer unit is calculated; and the determination is carried out by dividing the sum of the energies of vaporization of the individual monomer units by the sum of the molar volumes with calculation using the following formula (5).

$$\text{SPA or SPB}=\{4.184\times(\Sigma j\times\Sigma\Delta ei)/(\Sigma j\times\Sigma\Delta vi)\}^{0.5} \quad (5)$$

Measurement of The Glass Transition Temperature Tg of The Amorphous Resin B

The glass transition temperature (Tg) is measured using a "Q1000" differential scanning calorimeter (TA Instruments). The melting points of indium and zinc are used for temperature correction in the instrument detection section, and the heat of fusion of indium is used for correction of the amount of heat.

Specifically, 1 mg of the amorphous resin B is exactly weighed out and introduced into an aluminum pan; an empty aluminum pan is used for reference. Using modulation measurement mode, measurement is carried out in the range from 0° C. to 120° C. at a ramp rate of 1° C./minute and a temperature modulation condition of ±0.6° C./60 s. Because a change in the specific heat is obtained during the temperature ramp up process, the glass transition temperature (Tg) is taken to be the point at the intersection between the differential heat curve and the line for the midpoint for the baselines for prior to and subsequent to the appearance of the change in the specific heat.

When the temperature region where the specific heat change appears overlaps with an endothermic peak for, e.g., the crystalline resin or wax, the specific heat change is then produced around an endothermic peak. In such a case, the glass transition temperature (Tg) is taken to be the intersection between the straight line connecting the heat absorption start temperature (onset temperature) of the endothermic peak and the temperature of completion of heat absorption (offset temperature), and the line for the midpoint for the baselines for prior to and subsequent to the appearance of the change in the specific heat.

EXAMPLES

The following describes the present disclosure in more detail using examples, but the invention is not limited by the examples. In formulations described below, "parts" means "parts by mass", unless otherwise stated.

Crystalline Resin A1 Preparation Example

The following materials were introduced under a nitrogen atmosphere into a reactor fitted with a reflux condenser, stirrer, thermometer, and nitrogen introduction line.

| | |
|---|---|
| toluene | 100.0 parts |
| monomer composition | 100.0 parts |

(The Monomer Composition is Provided by Mixing the Following Monomers in the Following Proportions)

| |
|---|
| (behenyl acrylate (monomer (a)) 80.0 parts) |
| (styrene 18.0 parts) |
| (methacrylic acid 2.0 parts) |
| polymerization initiator: t-butyl peroxypivalate |
| (PERBUTYL PV, NOF Corporation) 0.5 parts |

While stirring in the aforementioned reactor at 200 rpm, a polymerization reaction was run for 12 hours with heating to 70° C. to obtain a solution in which a polymer of the monomer composition was dissolved in toluene. This solution was then cooled to 25° C. followed by the introduction of the solution while stirring into 1000.0 parts of methanol to precipitate methanol-insoluble matter. The resulting methanol-insoluble matter was filtered off and was additionally washed with methanol, followed by vacuum drying for 24 hours at 40° C. to yield a crystalline resin A1.

Crystalline Resins A2 to A11 Preparation Example

Crystalline resins A2 to A11 were prepared proceeding entirely as in the Crystalline Resin A1 Preparation Example, but changing the amount of addition of the monomer composition as indicated in Table 1.

TABLE 1

| | Monomer (a) | | | Other monomer 1 | | Other monomer 2 | | Other monomer 3 | | Resin properties | |
|---|---|---|---|---|---|---|---|---|---|---|---|
| C.R. A | Species | Number of carbons m | Amount of addition (parts) | Species | Amount of addition (parts) | Species | Amount of addition (parts) | Species | Amount of addition (parts) | Unit (a) content (mass %) | SPA [(J/cm$^3$)$^{0.5}$] |
| C.R. A1 | Behenyl acrylate | 21 | 80.0 | Styrene | 18.0 | Methacrylic acid | 2.0 | — | — | 80.0 | 18.69 |
| C.R. A2 | Stearyl acrylate | 17 | 40.0 | Styrene | 18.0 | Methacrylic acid | 2.0 | — | — | 80.0 | 18.80 |
| | Behenyl acrylate | 21 | 40.0 | | | | | | | | |
| C.R. A3 | Behenyl acrylate | 21 | 75.0 | Styrene | 18.0 | Methacrylic acid | 2.0 | — | — | 80.0 | 18.54 |
| | Myricyl acrylate | 29 | 5.0 | | | | | | | | |
| C.R. A4 | Behenyl acrylate | 21 | 52.0 | Styrene | 46.0 | Methacrylic acid | 2.0 | — | — | 52.0 | 19.21 |
| C.R. A5 | Behenyl acrylate | 21 | 65.0 | Styrene | 33.0 | Methacrylic acid | 2.0 | — | — | 65.0 | 18.97 |
| C.R. A6 | Behenyl acrylate | 21 | 73.0 | Styrene | 25.0 | Methacrylic acid | 2.0 | — | — | 73.0 | 18.82 |
| C.R. A7 | Behenyl acrylate | 21 | 95.0 | Styrene | 3.0 | Methacrylic acid | 2.0 | — | — | 95.0 | 18.51 |
| C.R. A8 | Behenyl acrylate | 21 | 75.0 | Styrene | 8.0 | Methacrylic acid | 2.0 | Methacrylo-nitrile | 15.0 | 75.0 | 19.59 |
| C.R. A9 | Lauryl acrylate | 11 | 80.0 | Styrene | 18.0 | Methacrylic acid | 2.0 | — | — | 80.0 | 19.68 |
| C.R. A10 | Behenyl acrylate | 21 | 48.0 | Styrene | 50.0 | Methacrylic acid | 2.0 | — | — | 48.0 | 19.53 |
| C.R. A11 | Behenyl acrylate | 21 | 70.0 | Styrene | 12.0 | Methacrylic acid | 2.0 | Methacrylo-nitrile | 16.0 | 70.0 | 19.74 |

In Table 1, C.R. represents Crystalline resin.

Amorphous Resin B1 Preparation Example

The following materials were introduced under a nitrogen atmosphere into a reactor fitted with a reflux condenser, stirrer, thermometer, and nitrogen introduction line.

| | |
|---|---|
| toluene | 100.0 parts |
| monomer composition | 100.0 parts |

(The Monomer Composition is Provided by Mixing the Following Monomers in the Following Proportions)

| |
|---|
| (lauryl acrylate 25.0 parts) |
| (styrene 75.0 parts) |
| polymerization initiator: t-butyl peroxypivalate |
| (PERBUTYL PV, NOF Corporation) 0.5 parts |

While stirring in the aforementioned reactor at 200 rpm, a polymerization reaction was run for 12 hours with heating to 70° C. to obtain a solution in which a polymer of the monomer composition was dissolved in toluene. This solution was then cooled to 25° C. followed by the introduction of the solution while stifling into 1000.0 parts of methanol to precipitate methanol-insoluble matter. The resulting methanol-insoluble matter was filtered off and was additionally washed with methanol, followed by vacuum drying for 24 hours at 40° C. to yield an amorphous resin B1.

Resin C1 Preparation Example

The following starting materials were introduced into a reactor fitted with a condenser, stirrer, and nitrogen introduction line and a reaction was run for 15 hours at 220° C. under normal pressure, followed by additional reaction for 0.5 hours under a reduced pressure of 1.3 to 2.6 kPa.

| | |
|---|---|
| terephthalic acid | 210.0 parts |
| isophthalic acid | 210.0 parts |
| 2 mol propylene oxide adduct on bisphenol A | 1200.0 parts |
| potassium titanium oxalate | 0.3 parts |

The temperature was then dropped to 180° C. and 0.01 parts trimellitic anhydride was added and a reaction was run for 1.5 hours at 180° C. to obtain a resin C1.

Example 1

Example of Toner Production by Suspension Polymerization

Toner Particle 1 Production Example

| | |
|---|---|
| lauryl acrylate | 15.0 parts |
| styrene | 45.0 parts |
| colorant:Pigment Blue 15:3 | 6.5 parts |

A mixture of these materials was prepared. This mixture was introduced into an attritor (Nippon Coke & Engineering Co., Ltd.), and a starting material dispersion was obtained by dispersing for 2 hours at 200 rpm using zirconia beads with a diameter of 5 mm.

Otherwise, 735.0 parts of deionized water and 16.0 parts of trisodium phosphate (dodecahydrate) were added to a vessel outfitted with a Homomixer high-speed stirrer (PRIMIX Corporation) and a thermometer, and the temperature was raised to 60° C. while stifling at 12,000 rpm. To this was added an aqueous calcium chloride solution of 9.0 parts calcium chloride (dihydrate) dissolved in 65.0 parts deionized water, and stirring was carried out for 30 minutes at 12,000 rpm while maintaining 60° C. To this was added 10% hydrochloric acid to adjust the pH to 6.0 and obtain an aqueous medium in which a hydroxyapatite-containing inorganic dispersion stabilizer was dispersed in water.

The aforementioned starting material dispersion was then transferred to a vessel equipped with a stirrer and thermometer and the temperature was raised to 60° C. while stirring at 100 rnm.

| | |
|---|---|
| crystalline resin A1 | 40.0 parts |
| release agent 1 | 9.0 parts |

(Release Agent 1: DP18 (Dipentaerythritol Stearate Ester Wax, Melting Point=79° C., Nippon Seiro Co., Ltd.))

These materials were added to the preceding and stirring was performed for 30 minutes at 100 rpm while holding at 60° C.; 9.0 parts of the polymerization initiator t-butyl peroxypivalate (PERBUTYL PV, NOF Corporation) was then added and stirring was carried out for an additional 1 minute; and introduction was subsequently carried out into the aqueous medium that was being stirred at 12,000 rpm with the high-speed stirrer. Stirring was continued for 20 minutes at 12,000 rpm with the high-speed stirrer while holding at 60° C. to obtain a granulation solution.

The granulation solution was transferred to a reactor outfitted with a reflux condenser, stirrer, thermometer, and nitrogen introduction line, and the temperature was raised to 70° C. while stirring at 150 rpm under a nitrogen atmosphere. A polymerization reaction was run for 12 hours at 150 rpm while holding at 70° C. to obtain a toner particle dispersion.

The resulting toner particle dispersion was cooled to 45° C. while stifling at 150 rpm, and, while keeping the 45° C., a heat treatment was subsequently performed for 5 hours. Then, while holding the stifling without change, dilute hydrochloric acid was added to bring the pH to 1.5 and the dispersion stabilizer was dissolved. The solid fraction was filtered off and thoroughly washed with deionized water, followed by vacuum drying for 24 hours at 30° C. to obtain a toner particle 1, which was a nonmagnetic toner particle.

Toner 1 Preparation Example 2.0 parts of silica fine particles (hydrophobically treated with hexamethyldisilazane, number-average primary particle diameter: 10 nm, BET specific surface area: 170 $m^2/g$) as an external additive was added per 98.0 parts of the obtained toner particle 1, and mixing was carried out for 15 minutes at 3,000 rpm using a Henschel mixer (Nippon Coke & Engineering Co., Ltd.) to obtain a toner 1, which was a nonmagnetic toner.

The properties of the obtained toner 1 are given in Table 3-1 and Table 3-2 and the results of its evaluation are given in Table 4.

TABLE 2-1

| | | | Binder resin | | | | | | |
|---|---|---|---|---|---|---|---|---|---|
| | | | | | Amorphous resin B | | | | |
| | | | C.R. A | | Polymerizable monomer X | | | Polymerizable monomer Y | |
| | Toner No. | Production method | Species | Amount of addition (parts) | Species | Number of carbons n | Amount of addition (parts) | Species | Amount of addition (parts) |
| Example 1 | 1 | S.P. | C.R. A1 | 40.0 | Lauryl acrylate | 11 | 15.0 | Styrene | 45.0 |
| Example 2 | 2 | S.P. | C.R. A2 | 40.0 | Lauryl acrylate | 11 | 15.0 | Styrene | 45.0 |
| Example 3 | 3 | S.P. | C.R. A3 | 40.0 | Lauryl acrylate | 11 | 15.0 | Styrene | 45.0 |
| Example 4 | 4 | S.P. | C.R. A4 | 40.0 | Lauryl acrylate | 11 | 15.0 | Styrene | 45.0 |
| Example 5 | 5 | S.P. | C.R. A5 | 40.0 | Lauryl acrylate | 11 | 15.0 | Styrene | 45.0 |
| Example 6 | 6 | S.P. | C.R. A6 | 40.0 | Lauryl acrylate | 11 | 15.0 | Styrene | 45.0 |
| Example 7 | 7 | S.P. | C.R. A7 | 40.0 | Lauryl acrylate | 11 | 15.0 | Styrene | 45.0 |
| Example 8 | 8 | S.P. | C.R. A1 | 12.0 | Lauryl acrylate | 11 | 22.0 | Styrene | 66.0 |
| Example 9 | 9 | S.P. | C.R. A1 | 36.5 | Lauryl acrylate | 11 | 15.9 | Styrene | 47.6 |
| Example 10 | 10 | S.P. | C.R. A1 | 51.5 | Lauryl acrylate | 11 | 12.1 | Styrene | 36.4 |
| Example 11 | 11 | S.P. | C.R. A1 | 55.0 | Lauryl acrylate | 11 | 11.3 | Styrene | 33.8 |
| Example 12 | 12 | S.P. | C.R. A1 | 62.0 | Lauryl acrylate | 11 | 9.5 | Styrene | 28.5 |
| Example 13 | 13 | S.P. | C.R. A1 | 68.0 | Lauryl acrylate | 11 | 8.0 | Styrene | 24.0 |
| Example 14 | 14 | S.P. | C.R. A1 | 40.0 | Behenyl acrylate | 21 | 15.0 | Styrene | 45.0 |
| Example 15 | 15 | S.P. | C.R. A1 | 40.0 | Lauryl acrylate | 11 | 9.5 | Styrene | 28.5 |
| Example 16 | 16 | S.P. | C.R. A1 | 27.0 | Lauryl acrylate | 11 | 13.0 | Styrene | 39.0 |
| Example 17 | 17 | S.P. | C.R. A8 | 40.0 | Lauryl acrylate | 11 | 15.0 | Styrene | 45.0 |
| Example 18 | 18 | S.P. | C.R. A1 | 40.0 | Lauryl acrylate | 11 | 15.0 | Styrene | 36.0 |
| Example 19 | 19 | S.P. | C.R. A1 | 40.0 | Lauryl acrylate | 11 | 1.8 | Styrene | 58.2 |
| Example 20 | 20 | S.P. | C.R. A1 | 40.0 | Lauryl acrylate | 11 | 4.8 | Styrene | 55.2 |
| Example 21 | 21 | S.P. | C.R. A1 | 40.0 | Lauryl acrylate | 11 | 22.8 | Styrene | 37.2 |
| Example 22 | 22 | S.P. | C.R. A1 | 40.0 | Lauryl acrylate | 11 | 25.8 | Styrene | 34.2 |
| Example 23 | 23 | S.P. | C.R. A1 | 40.0 | Lauryl acrylate | 11 | 15.0 | Methyl methacrylate | 45.0 |
| Example 24 | 24 | S.P. | C.R. A1 | 40.0 | Lauryl acrylate | 11 | 15.0 | Styrene | 30.0 |
| C.E. 1 | Comparative 1 | S.P. | C.R. A9 | 40.0 | Lauryl acrylate | 11 | 15.0 | Styrene | 45.0 |
| C.E. 2 | Comparative 2 | S.P. | C.R. A10 | 40.0 | Lauryl acrylate | 11 | 15.0 | Styrene | 45.0 |
| C.E. 3 | Comparative 3 | S.P. | C.R. A1 | 10.0 | Lauryl acrylate | 11 | 22.5 | Styrene | 67.5 |
| C.E. 4 | Comparative 4 | S.P. | C.R. A1 | 70.0 | Lauryl acrylate | 11 | 7.5 | Styrene | 22.5 |

TABLE 2-1-continued

| | | | Binder resin | | | | | | | |
|---|---|---|---|---|---|---|---|---|---|---|
| | | | C.R. A | | Amorphous resin B | | | | | |
| | | | | | Polymerizable monomer X | | | Polymerizable monomer Y | |
| | Toner No. | Production method | Species | Amount of addition (parts) | Species | Number of carbons n | Amount of addition (parts) | Species | Amount of addition (parts) |
| C.E. 5 | Comparative 5 | S.P. | C.R. A1 | 40.0 | — | — | — | Styrene | 60.0 |
| C.E. 6 | Comparative 6 | S.P. | C.R. A11 | 40.0 | Lauryl acrylate | 11 | 15.0 | Styrene | 45.0 |
| C.E. 7 | Comparative 7 | S.P. | C.R. A1 | 40.0 | Lauryl acrylate | 11 | 15.0 | Styrene | 31.8 |

TABLE 2-2

| | Binder resin | | | |
|---|---|---|---|---|
| | Amorphous resin B Polymerizable monomer Z | | Resin C | |
| | Species | Amount of addition (parts) | Species | Amount of addition (parts) |
| Example 1 | — | — | — | — |
| Example 2 | — | — | — | — |
| Example 3 | — | — | — | — |
| Example 4 | — | — | — | — |
| Example 5 | — | — | — | — |
| Example 6 | — | — | — | — |
| Example 7 | — | — | — | — |
| Example 8 | — | — | — | — |
| Example 9 | — | — | — | — |
| Example 10 | — | — | — | — |
| Example 11 | — | — | — | — |
| Example 12 | — | — | — | — |
| Example 13 | — | — | — | — |
| Example 14 | — | — | — | — |
| Example 15 | — | — | C1 | 22.0 |
| Example 16 | — | — | C1 | 21.0 |
| Example 17 | — | — | — | — |
| Example 18 | Methacrylonitrile | 9.0 | — | — |

TABLE 2-2-continued

| | Binder resin | | | |
|---|---|---|---|---|
| | Amorphous resin B Polymerizable monomer Z | | Resin C | |
| | Species | Amount of addition (parts) | Species | Amount of addition (parts) |
| Example 19 | — | — | — | — |
| Example 20 | — | — | — | — |
| Example 21 | — | — | — | — |
| Example 22 | — | — | — | — |
| Example 23 | — | — | — | — |
| Example 24 | t-butyl methacrylate | 15.0 | — | — |
| C.E. 1 | — | — | — | — |
| C.E. 2 | — | — | — | — |
| C.E. 3 | — | — | — | — |
| C.E. 4 | — | — | — | — |
| C.E. 5 | — | — | — | — |
| C.E. 6 | — | — | — | — |
| C.E. 7 | Methacrylonitrile | 13.2 | — | — |

In the Tables 2-1 and 2-2, C1 indicates resin C1, C. E. indicates Comparative Example, S. P. indicates Suspension polymerization, and C.R. indicates Crystalline resin.

TABLE 3-1

| | Toner No. | Production method | SPB − SPA $[(J/cm^3)^{0.5}]$ | Content of crystalline resin A in the toner (mass %) | Content of amorphous resin B in the toner (mass %) | Content of crystalline resin A + amorphous resin B in the toner (mass %) |
|---|---|---|---|---|---|---|
| Example 1 | 1 | Suspension polymerization | 1.07 | 34.0 | 51.1 | 85.1 |
| Example 2 | 2 | Suspension polymerization | 0.96 | 34.0 | 51.1 | 85.1 |
| Example 3 | 3 | Suspension polymerization | 1.22 | 34.0 | 51.1 | 85.1 |
| Example 4 | 4 | Suspension polymerization | 0.55 | 34.0 | 51.1 | 85.1 |
| Example 5 | 5 | Suspension polymerization | 0.79 | 34.0 | 51.1 | 85.1 |
| Example 6 | 6 | Suspension polymerization | 0.94 | 34.0 | 51.1 | 85.1 |
| Example 7 | 7 | Suspension polymerization | 1.25 | 34.0 | 51.1 | 85.1 |
| Example 8 | 8 | Suspension polymerization | 1.07 | 10.2 | 74.9 | 85.1 |
| Example 9 | 9 | Suspension polymerization | 1.07 | 31.1 | 54.0 | 85.1 |
| Example 10 | 10 | Suspension polymerization | 1.07 | 43.8 | 41.3 | 85.1 |
| Example 11 | 11 | Suspension polymerization | 1.07 | 46.8 | 38.3 | 85.1 |
| Example 12 | 12 | Suspension polymerization | 1.07 | 52.8 | 32.3 | 85.1 |
| Example 13 | 13 | Suspension polymerization | 1.07 | 57.9 | 27.2 | 85.1 |
| Example 14 | 14 | Suspension polymerization | 0.94 | 34.0 | 51.1 | 85.1 |
| Example 15 | 15 | Suspension polymerization | 1.07 | 34.0 | 32.3 | 66.4 |
| Example 16 | 16 | Suspension polymerization | 1.07 | 23.0 | 44.3 | 67.2 |
| Example 17 | 17 | Suspension polymerization | 0.17 | 34.0 | 51.1 | 85.1 |
| Example 18 | 18 | Suspension polymerization | 1.90 | 34.0 | 51.1 | 85.1 |
| Example 19 | 19 | Suspension polymerization | 1.35 | 34.0 | 51.1 | 85.1 |
| Example 20 | 20 | Suspension polymerization | 1.34 | 34.0 | 51.1 | 85.1 |
| Example 21 | 21 | Suspension polymerization | 1.01 | 34.0 | 51.1 | 85.1 |
| Example 22 | 22 | Suspension polymerization | 0.97 | 34.0 | 51.1 | 85.1 |
| Example 23 | 23 | Suspension polymerization | 1.17 | 34.0 | 51.1 | 85.1 |

TABLE 3-1-continued

| | Toner No. | Production method | SPB − SPA $[(J/cm^3)^{0.5}]$ | Content of crystalline resin A in the toner (mass %) | Content of amorphous resin B in the toner (mass %) | Content of crystalline resin A + amorphous resin B in the toner (mass %) |
|---|---|---|---|---|---|---|
| Example 24 | 24 | Suspension polymerization | 0.70 | 34.0 | 51.1 | 85.1 |
| Example 25 | 25 | Emulsion aggregation | 1.07 | 34.0 | 51.1 | 85.1 |
| Example 26 | 26 | Pulverization | 1.07 | 34.0 | 51.1 | 85.1 |
| C.E. 1 | Comparative 1 | Suspension polymerization | 0.08 | 34.0 | 51.1 | 85.1 |
| C.E. 2 | Comparative 2 | Suspension polymerization | 0.23 | 34.0 | 51.1 | 85.1 |
| C.E. 3 | Comparative 3 | Suspension polymerization | 1.07 | 8.5 | 76.6 | 85.1 |
| C.E. 4 | Comparative 4 | Suspension polymerization | 1.07 | 59.6 | 25.5 | 85.1 |
| C.E. 5 | Comparative 5 | Suspension polymerization | 1.38 | 34.0 | 51.1 | 85.1 |
| C.E. 6 | Comparative 6 | Suspension polymerization | 0.02 | 34.0 | 51.1 | 85.1 |
| C.E. 7 | Comparative 7 | Suspension polymerization | 2.29 | 34.0 | 51.1 | 85.1 |

TABLE 3-2

| | Toner No. | Content of monomer unit (a) in crystalline resin A (mass %) | Content of monomer unit (b) in amorphous resin B (mass %) | Glass transition temperature of amorphous resin B (° C.) | Mw of the toner |
|---|---|---|---|---|---|
| Example 1 | 1 | 80.0 | 25.0 | 47.3 | 102500 |
| Example 2 | 2 | 80.0 | 25.0 | 47.3 | 124050 |
| Example 3 | 3 | 80.0 | 25.0 | 47.3 | 87900 |
| Example 4 | 4 | 52.0 | 25.0 | 47.3 | 93800 |
| Example 5 | 5 | 65.0 | 25.0 | 47.3 | 107300 |
| Example 6 | 6 | 73.0 | 25.0 | 47.3 | 99800 |
| Example 7 | 7 | 95.0 | 25.0 | 47.3 | 103800 |
| Example 8 | 8 | 80.0 | 25.0 | 47.3 | 101800 |
| Example 9 | 9 | 80.0 | 25.0 | 47.3 | 92450 |
| Example 10 | 10 | 80.0 | 25.0 | 47.3 | 95700 |
| Example 11 | 11 | 80.0 | 25.0 | 47.3 | 81800 |
| Example 12 | 12 | 80.0 | 25.0 | 47.3 | 83650 |
| Example 13 | 13 | 80.0 | 25.0 | 47.3 | 76350 |
| Example 14 | 14 | 80.0 | 25.0 | 44.2 | 94800 |
| Example 15 | 15 | 80.0 | 25.0 | 47.3 | 63800 |
| Example 16 | 16 | 80.0 | 25.0 | 47.3 | 65700 |
| Example 17 | 17 | 75.0 | 25.0 | 47.3 | 94250 |
| Example 18 | 18 | 80.0 | 25.0 | 49.2 | 96600 |
| Example 19 | 19 | 80.0 | 3.0 | 77.6 | 82640 |
| Example 20 | 20 | 80.0 | 8.0 | 80.1 | 96700 |
| Example 21 | 21 | 80.0 | 38.0 | 39.8 | 110080 |
| Example 22 | 22 | 80.0 | 43.0 | 34.5 | 94800 |
| Example 23 | 23 | 80.0 | 25.0 | 47.8 | 101800 |
| Example 24 | 24 | 80.0 | 25.0 | 45.8 | 94700 |
| Example 25 | 25 | 80.0 | 25.0 | 47.3 | 86800 |
| Example 26 | 26 | 80.0 | 25.0 | 47.3 | 87400 |
| C.E. 1 | Comparative 1 | 80.0 | 25.0 | 47.3 | 94550 |
| C.E. 2 | Comparative 2 | 48.0 | 25.0 | 47.3 | 101050 |
| C.E. 3 | Comparative 3 | 80.0 | 25.0 | 47.3 | 113400 |
| C.E. 4 | Comparative 4 | 80.0 | 25.0 | 47.3 | 78550 |
| C.E. 5 | Comparative 5 | 80.0 | 0.0 | 90.0 | 100480 |
| C.E. 6 | Comparative 6 | 70.0 | 25.0 | 47.3 | 88650 |
| C.E. 7 | Comparative 7 | 80.0 | 25.0 | 50.5 | 94650 |

In the Tables 3-1 and 3-2, the Mw of the toner is the weight-average molecular weight Mw of the THF-soluble matter of the toner, and C. E. represents Comparative Example.

Examples 2 to 24

Toner particles 2 to 24 were obtained proceeding entirely as in Example 1, but changing, as shown in Tables 2-1 and 2-2, the species and amount of addition of the polymerizable monomer that was used. Toners 2 to 24 were obtained by carrying out the same external addition as in Example 1. The properties of the toners are given in Table 3-1 and Table 3-2, and the results of their evaluation are given in Table 4. According to the previously described analyses, each monomer unit forming the crystalline resin A in toners 1 to 24 was incorporated in the same proportions as the formulations described in Table 1. In addition, each monomer unit forming the amorphous resin B was incorporated in the same proportions as the formulations described in Tables 2-1 and 2-2.

Example 25

Example of Toner Production by an Emulsion Aggregation Method

Example of the Preparation of a Crystalline Resin Dispersion

| | |
|---|---|
| toluene | 300.0 parts |
| crystalline resin A1 | 100.0 parts |

These materials were weighed out and mixed and dissolution was carried out at 90° C.

Separately, 5.0 parts of sodium dodecylbenzenesulfonate and 10.0 parts of sodium laurate were added to 700.0 parts of deionized water and dissolution was carried out with heating at 90° C. The toluene solution was then mixed with the aqueous solution and stirring at 7,000 rpm was performed using a T. K. Robomix ultrahigh-speed stirrer (PRIMIX Corporation).

Emulsification was performed at a pressure of 200 MPa using a Nanomizer high-pressure impact-type disperser (Yoshida Kikai Co., Ltd.). The toluene was subsequently removed using an evaporator and the concentration was adjusted using deionized water to yield a crystalline resin dispersion having a 20% concentration of crystalline resin A1 fine particles.

The 50% particle diameter (D50) on a volume basis of the crystalline resin A1 fine particles was measured at 0.40 μm using a Nanotrac UPA-EX150 dynamic light-scattering particle size distribution analyzer (Nikkiso Co., Ltd.).

Example of the Preparation of an Amorphous Resin Dispersion

| | |
|---|---|
| toluene | 300.0 parts |
| amorphous resin B1 | 100.0 parts |

These materials were weighed out and mixed and dissolution was carried out at 90° C.

Separately, 5.0 parts of sodium dodecylbenzenesulfonate and 10.0 parts of sodium laurate were added to 700.0 parts of deionized water and dissolution was carried out with heating at 90° C. The toluene solution was then mixed with the aqueous solution and stirring at 7,000 rpm was performed using a T. K. Robomix ultrahigh-speed stirrer (PRIMIX Corporation).

Emulsification was performed at a pressure of 200 MPa using a Nanomizer high-pressure impact-type disperser (Yoshida Kikai Co., Ltd.). The toluene was subsequently removed using an evaporator and the concentration was adjusted using deionized water to yield an amorphous resin dispersion having a 20% concentration of amorphous resin fine particles.

The 50% particle diameter (D50) on a volume basis of the amorphous resin fine particles was measured at 0.38 μm using a Nanotrac UPA-EX150 dynamic light-scattering particle size distribution analyzer (Nikkiso Co., Ltd.).

Example of the Preparation of a Release Agent Dispersion

| | |
|---|---|
| release agent 1 | 100.0 parts |
| Neogen RK anionic surfactant (Dai-ichi Kogyo Seiyaku Co., Ltd.) | 5.0 parts |
| deionized water | 395.0 parts |

The preceding materials were weighed and introduced into a mixing container equipped with a stirrer and were heated to 90° C., and a dispersion treatment was then carried out for 60 minutes by circulation to a ClearMix W-Motion (M Technique Co., Ltd.). The conditions in the dispersion treatment were as follows.

rotor outer diameter=3 cm clearance=0.3 mm rotor rotation rate=19,000 r/min screen rotation rate=19,000 r/min After the dispersion treatment, cooling to 40° C. was carried out using cooling process conditions of a rotor rotation rate of 1,000 r/min, a screen rotation rate of 0 r/min, and a cooling rate of 10° C./min, to obtain a release agent dispersion having a 20% concentration of release agent fine particles. The 50% particle diameter (D50) on a volume basis of the release agent fine particles was measured at 0.15 μm using a Nanotrac UPA-EX150 dynamic light-scattering particle size distribution analyzer (Nikkiso Co., Ltd.).

Example of the Preparation of a Colorant Dispersion

| | |
|---|---|
| colorant (cyan pigment, Dainichiseika Color & Chemicals Mfg. Co., Ltd.: Pigment Blue | 50.0 parts |
| Neogen RK anionic surfactant (Dai-ichi Kogyo Seiyaku Co., Ltd.) | 7.5 parts |
| deionized water | 442.5 parts |

These materials were weighed out and mixed and dissolved, and dispersion was carried out for 1 hour using a Nanomizer high-pressure impact-type disperser (Yoshida Kikai Co., Ltd.) to yield a colorant dispersion, in which the colorant was dispersed, having a 10% concentration of colorant fine particles.

The 50% particle diameter (D50) on a volume basis of the colorant fine particles was measured at 0.20 μm using a Nanotrac UPA-EX150 dynamic light-scattering particle size distribution analyzer (Nikkiso Co., Ltd.).

Toner 25 Production Example

| | |
|---|---|
| crystalline resin dispersion | 200.0 parts |
| amorphous resin dispersion | 300.0 parts |
| release agent dispersion | 45.0 parts |
| colorant dispersion | 65.0 parts |
| deionized water | 160.0 parts |

These materials were introduced into a round stainless steel flask and were mixed. Dispersion was then carried out for 10 minutes at 5,000 r/min using an Ultra-Turrax T50 homogenizer (IKA). The pH was adjusted to 3.0 by adding a 1.0% aqueous nitric acid solution, and heating was subsequently carried out to 58° C. on a heating water bath while adjusting the rotation rate of a stirring blade as appropriate so the mixture was stirred.

The volume-average particle diameter of the aggregated particles that were formed was checked as appropriate using a Coulter Multisizer III, and, once aggregated particles having a weight-average particle diameter (D4) of 6.0 μm had been formed, the pH was brought to 9.0 using a 5% aqueous sodium hydroxide solution. Heating to 75° C. was then carried out while continuing to stir. Aggregated particle coalescence was brought about by holding for 1 hour at 75° C.

This was followed by cooling to 45° C. and execution of a heat treatment for 5 hours. This was followed by cooling to 25° C., filtration and solid-liquid separation, and then washing with deionized water. After the completion of washing, drying using a vacuum dryer yielded a toner particle 25 having a weight-average particle diameter (D4) of 6.1 μm.

Toner 25 was obtained by carrying out the same external addition as in Example 1 on the toner particle 25. The properties of toner 25 are given in Table 3-1 and Table 3-2, and the results of its evaluation are given in Table 4. According to the previously described analyses, each monomer unit forming the crystalline resin A1 in toner 25 was incorporated in the same proportions as the formulation for the production of the crystalline resin A1. In addition, each monomer unit forming the amorphous resin B1 was incorporated in the same proportions as the formulation for the production of the amorphous resin B1.

Example 26

Example of Toner Production by a Pulverization Method

| | |
|---|---|
| crystalline resin A1 | 40.0 parts |
| amorphous resin B1 | 60.0 parts |
| C.I. Pigment Blue 15:3 | 6.5 parts |
| release agent 1 | 9.0 parts |

These materials were pre-mixed using an FM mixer (Nippon Coke & Engineering Co., Ltd.) followed by melt-kneading with a twin-screw kneading extruder (Model PCM-30, Ikegai Ironworks Corporation).

The resulting kneaded material was cooled and coarsely pulverized using a hammer mill and was then pulverized using a mechanical pulverizer (T-250, Turbo Kogyo Co., Ltd.). The resulting finely pulverized powder was classified using a Coanda effect-based multi-grade classifier to yield a toner particle 26 having a weight-average particle diameter (D4) of 6.9 μm.

Toner 26 was obtained by carrying out the same external addition as in Example 1 on the toner particle 26. The properties of toner 26 are given in Table 3-1 and Table 3-2, and the results of its evaluation are given in Table 4. According to the previously described analyses, each monomer unit forming the crystalline resin A1 in toner 26 was incorporated in the same proportions as the formulation for the production of the crystalline resin A1. In addition, each monomer unit forming the amorphous resin B1 was incorporated in the same proportions as the formulation for the production of the amorphous resin B1.

Comparative Examples 1 to 7

Comparative toner particles 1 to 7 were obtained proceeding entirely as in Example 1, but changing, as shown in Table 1, the species and amount of addition of the polymerizable monomer that was used. Comparative toners 1 to 7 were obtained by carrying out the same external addition as in Example 1. The properties of the toners are given in Table 3-1 and Table 3-2, and the results of their evaluation are given in Table 4. Each monomer unit forming the crystalline resin A in comparative toners 1 to 7 was incorporated in the same proportions as the formulation described in Table 1. In addition, each monomer unit forming the amorphous resin B was incorporated in the same proportions as the formulations described in Tables 2-1 and 2-2.

Toner Evaluation Methods

<1> Low-Temperature Fixability

The toner-filled process cartridge was held for 48 hours at 25° C. and a humidity of 40% RH. Using an LBP-712Ci that had been modified so as to operate even with the fixing unit detached, an unfixed image was output of an image pattern in which 10 mm×10 mm square images were equally distributed at 9 points over the entire transfer paper. The fixing onset temperature was evaluated using 0.80 mg/cm$^2$ for the toner laid-on level on the transfer paper. A4 paper ("Plover Bond paper", 105 g/m$^2$, Fox River Paper Company) was used as the transfer paper.

The fixing unit of the LBP-712Ci was removed to the outside and was configured to operate even outside the laser beam printer, and this external fixing unit was used as the fixing unit. Fixing was carried out using this external fixing unit and a process speed of 240 mm/sec, with the fixation temperature being raised in 5° C. increments from a temperature of 90° C.

The fixed image was visually checked; the lowest temperature at which cold offset did not occur was denoted the fixing onset temperature; and the low-temperature fixability was evaluated using the following criteria. The results of the evaluation are given in Table 4.

Evaluation Criteria

A: the fixing onset temperature is 100° C. or less

B: the fixing onset temperature is from 105° C. to 110° C.

C: the fixing onset temperature is 115° C. or more and less than 120° C.

D: the fixing onset temperature is 120° C. or more

<2> Durability

Evaluation of Toner Durability

The durability was evaluated using a commercial LBP-712Ci printer from Canon, Inc. The toner present in the commercial cartridge was removed; the interior of the cartridge was cleaned with an air blower; and 200 g of the subject toner was filled to provide the cartridge used in the evaluation. This cartridge was held for 48 hours in a 25° C./40% RH environment and was then installed in the cyan station and the durability evaluation was performed.

Operating in a 25° C./40% RH environment and using Canon Oce Red Label (80 g/m$^2$) as the transfer paper, 20,000 prints were continuously output of a horizontal line pattern image having a print percentage of 1%. This was followed by the output of a solid image and a halftone image, and the presence/absence of the production of circumferential direction streaks caused by toner melt-bonding to the control member, i.e., development streaks, was visually checked. The results of the evaluation are given in Table 4.

Evaluation Criteria

A: development streaks are not produced

B: development streaks are produced at 1 or 2 locations

C: development streaks are produced at 3 or 4 locations

D: development streaks are produced at 5 or more locations

<3> Heat-Resistant Storability

The heat-resistant storability was evaluated in order to evaluate the stability during storage. 5 g of the toner was introduced into a 100-mL plastic cup; this was held for 3 days in an environment with a temperature of 50° C. and a humidity of 40% RH; and the degree of toner aggregation was measured as described below and was evaluated using the criteria given below.

The following was used as the measurement instrumentation: a "Model 1332A Digital Vibration Meter" (Showa Sokki Co., Ltd.) digital display vibration meter connected to the side surface of the vibrating platform of a "Powder Tester" (Hosokawa Micron Corporation). The following were stacked, in sequence from the bottom, on the vibrating platform of the Powder Tester: a sieve with an aperture of 38 μm (400 mesh), a sieve with an aperture of 75 μm (200 mesh), and a sieve with an aperture of 150 μm (100 mesh). The measurement was performed as follows in a 23° C./60% RH environment.

(1) The vibration amplitude of the vibrating platform was preliminarily adjusted so as to provide 0.60 mm (peak-to-peak) for the value of the displacement on the digital display vibration meter.

(2) The toner held for 3 days as described above was preliminarily held for 24 hours in a 23° C./60% RH environment. 5.00 g of the toner was then exactly weighed out and was carefully loaded on the sieve having an aperture of 150 μm, which was in the uppermost position.

(3) The screens were vibrated for 15 seconds; the mass of toner retained on each sieve was then measured; and the degree of aggregation was calculated on the basis of the following formula. The results of the evaluation are given in Table 4.

degree of aggregation (%)={(sample mass (g) on the sieve with an aperture of 150 Rm)/5.00 (g)}×100+{(sample mass (g) on the sieve with an aperture of 75 μm)/5.00 (g)}×100×0.6+{(sample mass (g) on the sieve with an aperture of 38 μm)/5.00 (g)}×100×0.2

Evaluation Criteria

A: the degree of aggregation is less than 10.0%

B: the degree of aggregation is 10.0% or more, and less than 15.0%

C: the degree of aggregation is 15.0% or more, and less than 20.0%

D: the degree of aggregation is 20.0% or more

<4> Charge Rise Performance

Using a commercial LBP-712Ci printer from Canon, Inc. and operating in a high-temperature, high-humidity environment (temperature of 32.5° C. and humidity of 80% RH), 5,000 prints of an image with a print percentage of 2% were printed out using this printer. After standing for 7 days, 1 print of an image having a white background region was printed out. The reflectance of the obtained image was measured using a reflection densitometer (Model TC-6DS Reflectometer, Tokyo Denshoku Co., Ltd.). An amber filter was used for the filter used in the measurement.

Using Dr−Ds for the fogging where Ds (%) is the worst value of the reflectance of the white background region and Dr (%) is the reflectance of the transfer material prior to image formation, the evaluation was performed using the following criteria. The results of the evaluation are given in Table 4.

Evaluation Criteria

A: the fogging is less than 1.0%

B: the fogging is 1.0% or more, and less than 3.0%

C: the fogging is 3.0% or more, and less than 5.0%

D: the fogging is 5.0% or more

TABLE 4

| | | Low-temperature fixability, cold offset | | | Heat-resistant storability | | Charge rise |
|---|---|---|---|---|---|---|---|
| | Toner | Fixing onset temperature (° C.) | Evaluation rank | Durability Evaluation rank | Degree of aggregation 3 days/50° C. | Evaluation rank | performance Evaluation rank |
| Example 1 | Toner 1 | 95 | A | A | 6.8 | A | A |
| Example 2 | Toner 2 | 90 | A | B | 17.3 | C | B |
| Example 3 | Toner 3 | 105 | B | A | 7.2 | A | A |
| Example 4 | Toner 4 | 115 | C | A | 6.1 | A | A |
| Example 5 | Toner 5 | 100 | A | A | 6.3 | A | A |
| Example 6 | Toner 6 | 100 | A | A | 6.5 | A | A |
| Example 7 | Toner 7 | 115 | C | A | 6.8 | A | A |
| Example 8 | Toner 8 | 105 | B | A | 6.4 | A | A |
| Example 9 | Toner 9 | 100 | A | A | 6.6 | A | A |
| Example 10 | Toner 10 | 95 | A | A | 6.8 | A | A |
| Example 11 | Toner 11 | 100 | A | A | 6.7 | A | B |
| Example 12 | Toner 12 | 95 | A | B | 7.0 | A | B |
| Example 13 | Toner 13 | 95 | A | C | 7.1 | A | B |
| Example 14 | Toner 14 | 105 | B | A | 7.0 | A | A |
| Example 15 | Toner 15 | 100 | A | Å | 6.4 | A | B |
| Example 16 | Toner 16 | 105 | B | A | 6.2 | A | A |
| Example 17 | Toner 17 | 95 | A | A | 9.2 | A | B |
| Example 18 | Toner 18 | 105 | B | C | 6.1 | A | A |
| Example 19 | Toner 19 | 100 | A | A | 6.1 | A | C |
| Example 20 | Toner 20 | 100 | A | A | 6.1 | A | B |
| Example 21 | Toner 21 | 100 | A | B | 6.8 | A | A |
| Example 22 | Toner 22 | 100 | A | C | 7.7 | A | A |
| Example 23 | Toner 23 | 100 | A | A | 7.3 | A | A |
| Example 24 | Toner 24 | 100 | A | A | 7.6 | A | A |
| Example 25 | Toner 25 | 100 | A | A | 8.3 | A | A |
| Example 26 | Toner 26 | 100 | A | A | 8.8 | A | A |
| C.E. 1 | C.T. 1 | 90 | A | B | 24.0 | D | B |
| C.E. 2 | C.T. 2 | 120 | D | A | 6.4 | A | D |
| C.E. 3 | C.T. 3 | 120 | D | A | 6.8 | A | A |
| C.E. 4 | C.T. 4 | 95 | A | D | 8.1 | A | C |
| C.E. 5 | C.T. 5 | 100 | A | A | 7.4 | A | D |
| C.E. 6 | C.T. 6 | 95 | A | A | 12.2 | B | D |
| C.E. 7 | C.T. 7 | 115 | C | D | 6.1 | A | A |

In the Table 4, C. E. represents Comparative Example and C.T. represents Comparative Toner.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100376, filed Jun. 22, 2022 which is hereby incorporated by reference herein in its entirety.

What is claimed is:

1. A nonmagnetic toner comprising a nonmagnetic toner particle, the nonmagnetic toner particle comprising:

a crystalline resin A;

an amorphous resin B; and a colorant, wherein the crystalline resin A has a monomer unit (a) represented by formula (a):

(a)

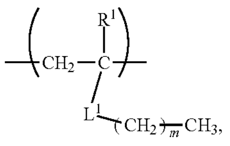

where, in the formula (a), $R^1$ represents a hydrogen atom or a methyl group, $L^1$ represents a single bond or a divalent linking group, and m represents 21, the amorphous resin B has a monomer unit (b) represented by formula (b);

(b)

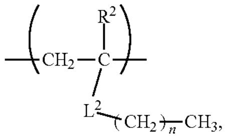

where, in the formula (b), $R^2$ represents a hydrogen atom or a methyl group, $L^2$ represents a single bond or a divalent linking group, and n represents 11, a content of the crystalline resin A in the nonmagnetic toner is 30.0 to 55.0 mass %, a content of the amorphous resin B in the nonmagnetic toner is 40.0 to 90.0 mass %, the sum of the content of the crystalline resin A in the nonmagnetic toner and the content of the amorphous resin B in the nonmagnetic toner is 65.0 mass % or more, a content of the monomer unit (a) in the crystalline resin A is 65.0 to 90.0 mass %, a content of the monomer unit (b) in the amorphous resin B is 15.0 to 50.0 mass %, and using SPA $[(J/cm^3)^{0.5}]$ for a SP value of the crystalline resin A and using SPB $[(J/cm^3)^{0.5}]$ for a SP value of the amorphous resin B, SPA and SPB satisfy $0.20 \leq SPB-SPA \leq 1.20$.

2. The nonmagnetic toner according to claim 1, wherein a content of the monomer unit (b) in the amorphous resin B is 5.0 to 30.0 mass %.

3. The nonmagnetic toner according to claim 1, wherein a glass transition temperature of the amorphous resin B is 30.0 to 90.0° C.

4. The nonmagnetic toner according to claim 1, wherein the monomer unit (a) is a monomer unit (a-1) represented by formula (a-1):

(a-1)

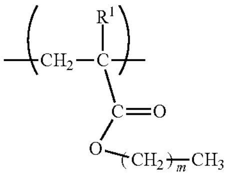

where, in the formula (a-1), $R^1$ represents a hydrogen atom or a methyl group and m represents 21.

5. The nonmagnetic toner according to claim 1, wherein the monomer unit (b) is a monomer unit (b-1) represented by formula (b-1):

(b-1)

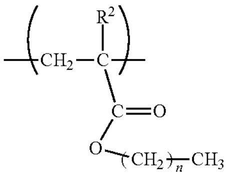

in the formula (b-1), $R^2$ represents a hydrogen atom or a methyl group and n represents 11.

* * * * *